UNITED STATES PATENT OFFICE.

THOMAS TAYLOR, OF WASHINGTON, DISTRICT OF COLUMBIA.

PROCESS OF PREPARING COTTON-SEED.

SPECIFICATION forming part of Letters Patent No. 249,691, dated November 15, 1881.

Application filed September 16, 1881. (Specimens.)

*To all whom it may concern:*

Be it known that I, THOMAS TAYLOR, of Washington, District of Columbia, have invented an Improved Process for Preparing Cotton-Seed; and I do hereby declare the following to be a full, clear, and exact description of the same.

My invention is an improved mode of cleaning and purifying cotton-seed. Heretofore such seed have been used, both for crushing or grinding into meal and for planting, in the condition in which they come from the cotton. In this condition they are surrounded by a coating of the cotton fiber, and have a thick shell or pericarp, the inner portions of which are hard and fibrous. In this natural condition the seeds include in their mass a large amount of indigestible and useless matter, which, when the seeds are ground for food, is inseparable, except at great expense, from the valuable and nutritive portions. Further, in this condition the good and bad seed are not distinguishable or separable, and when planted must be used in greater quantities in order to insure the requisite number of sprouts. I have found by careful and extensive experiments that if the cotton fiber be removed from the seeds, and the coating of woody or intercellular or gummy matter be taken off and the pericarp be reduced to the hard, woody shell which lies next to the kernel, the value of the seed is greatly enhanced, both for food purposes and for planting. For the latter purpose, especially, the seeds are greatly improved, since, first, the bad seeds may be removed by floating them upon water, while the good seeds sink therein; and, further, for the reason that by the reduction of the fibrous and woody coating the seeds sprout more quickly after planting. For other purposes the seeds, when their pericarp is reduced to the hard, woody inner shell alone, are more valuable, since their shells may be easily cracked and removed from the kernel.

My process consists in treating these cotton-seeds with sulphuric acid, in the special manner hereinafter described, whereby the seeds are left with a hard, woody shell, capable of protecting them from dampness or other injury in handling or storage, but are fitted especially for crushing or sprouting.

In carrying out my invention I place a quantity of cotton-seeds, in the natural crude state, in a suitable vessel, and add thereto sulphuric acid of 66° Baumé, in the proportion of from two to four ounces of the acid to a pound of the seed, the amount of acid between these two extremes varying with its strength. This amount I have found advantageous and sufficient for rapidly, effectually, and safely removing the fibrous and other outer coating from the seed. It is essential to the proper operation of the process and the suitable preservation of the seed that it should be dry, to prevent heating when the acid is added. The acid should be evenly stirred with the mass of seed. The seed is subjected to the action of the acid about fifteen (15) minutes, although it may be held therein even longer, as the acid does not readily act on the hard, woody inner shell. After the seed is removed from the acid, or the acid removed from the seed, either of which may be done by any suitable means, I subject them to friction by any suitable machinery, such as brushes or revolving cylinders. The seeds are next subjected to a bath of lime-water to remove all traces of the acid. After this the seeds are washed in pure water to remove the lime, and are then dried, when they are fit for storage or for immediate use, either by the planter or to crush for food. Instead of lime it is obvious that any equivalent alkaline substance may be used.

In this process it will be observed that the proper result depends upon the removal of the fiber and outer coating alone. It is essential that the action of the acid and friction should be suspended before the hard shell is removed or fractured.

I am aware that the treatment of grains by sulphuric acid is not new, such treatment having been described in English Patent No. 3,309 of 1874, and in No. 247 of 1875. My process differs from these in this, that in applying it to the cotton-seed I so conduct the process, as described, that only the outer rough and fibrous covering is removed, and the hard, woody shell, capable of polish, and completely protecting the kernel, remains; and, further, I apply an alkaline bath to arrest, at the proper point, the action of the acid and leave the seeds in proper condition and entirely unharmed.

It is incidental to the condition brought about by this process that the seeds, when designed for planting, may be placed in water without injury, for the purpose of separating the perfect from the imperfect—the latter floating, the former sinking. The seeds may then be dried, and those unfit for planting may be used for other purposes.

Having thus described my invention, what I claim is—

The described process of treating cottonseed, consisting in subjecting the seed to the action of sulphuric acid until the adherent fiber and outer coating of the shells are dissolved or softened, then rubbing to complete the removal of said outer coating, leaving a hard inner shell, and subsequently applying a lime or equivalent bath, substantially as described.

In testimony whereof I affix my signature in presence of two witnesses.

THOMAS TAYLOR.

Witnesses:
W. WALL,
A. M. LONG.